(12) United States Patent
Fjellstad et al.

(10) Patent No.: US 9,180,936 B2
(45) Date of Patent: Nov. 10, 2015

(54) CONTROL DEVICE FOR POSITIONING AN INSTRUMENTED CABLE TOWED IN WATER

(75) Inventors: Ola Erik Fjellstad, Trondheim (NO); Arne Rinnan, Trondheim (NO); Olav Magnus Berge, Skoppum (NO); Jan Erik Faugstadmo, Tolvsrod (NO); Sveinung Skjervheim, Horten (NO); Snorre Bache, Spongdal (NO)

(73) Assignee: KONGSBERG SEATEX AS, Trondheim (NO)

(*) Notice: Subject to any disclaimer, the term of this patent is extended or adjusted under 35 U.S.C. 154(b) by 542 days.

(21) Appl. No.: 13/260,314

(22) PCT Filed: Jul. 6, 2010

(86) PCT No.: PCT/NO2010/000267
§ 371 (c)(1),
(2), (4) Date: Sep. 29, 2011

(87) PCT Pub. No.: WO2011/010932
PCT Pub. Date: Jan. 27, 2011

(65) Prior Publication Data
US 2012/0026828 A1    Feb. 2, 2012

(30) Foreign Application Priority Data
Jul. 7, 2009   (NO) .................................. 20092575

(51) Int. Cl.
*G01V 1/38* (2006.01)
*B63B 21/66* (2006.01)
*B63G 8/42* (2006.01)

(52) U.S. Cl.
CPC . *B63B 21/66* (2013.01); *B63G 8/42* (2013.01); *G01V 1/3826* (2013.01)

(58) Field of Classification Search
USPC .............................. 367/16–20; 114/244–246
See application file for complete search history.

(56) References Cited

U.S. PATENT DOCUMENTS

| | | | |
|---|---|---|---|
| 4,033,278 A | 7/1977 | Waters | |
| 4,711,194 A * | 12/1987 | Fowler | 114/245 |
| 6,016,286 A * | 1/2000 | Olivier et al. | 367/17 |
| 6,144,342 A * | 11/2000 | Bertheas et al. | 343/709 |
| 6,525,992 B1 | 2/2003 | Olivier et al. | |
| 7,092,315 B2 * | 8/2006 | Olivier | 367/17 |
| 7,403,448 B2 * | 7/2008 | Welker et al. | 367/17 |
| 7,423,929 B1 * | 9/2008 | Olivier | 367/17 |
| 7,933,163 B2 * | 4/2011 | Fossum et al. | 367/16 |
| 8,113,135 B2 * | 2/2012 | Catherin et al. | 114/244 |

(Continued)

FOREIGN PATENT DOCUMENTS

WO      2009 088291      7/2009

*Primary Examiner* — Ian J Lobo
(74) *Attorney, Agent, or Firm* — Ladas & Parry LLP

(57) ABSTRACT

Control device (10, 50) for controlling the position of an instrumented cable towed in water, such as a marine seismic streamer, and/or an instrumented towed cable array (streamer array) with the possibility of controlling the individual instrumented cables both with in shape and position in relation to other instrumented cables and by that counteract cross currents and/or other dynamic forces which affect a towed array behind a seismic survey vessel, which control device (10, 50) is provided with one or more acoustic means, such as acoustic transmitter/receiver elements (40), arranged to or integrated in the wings (11, 52), main body (12, 53) or motor and drive gear housings (51) of the control device for determination of position and distance.

21 Claims, 6 Drawing Sheets

(56) References Cited

U.S. PATENT DOCUMENTS

Figure 1A:
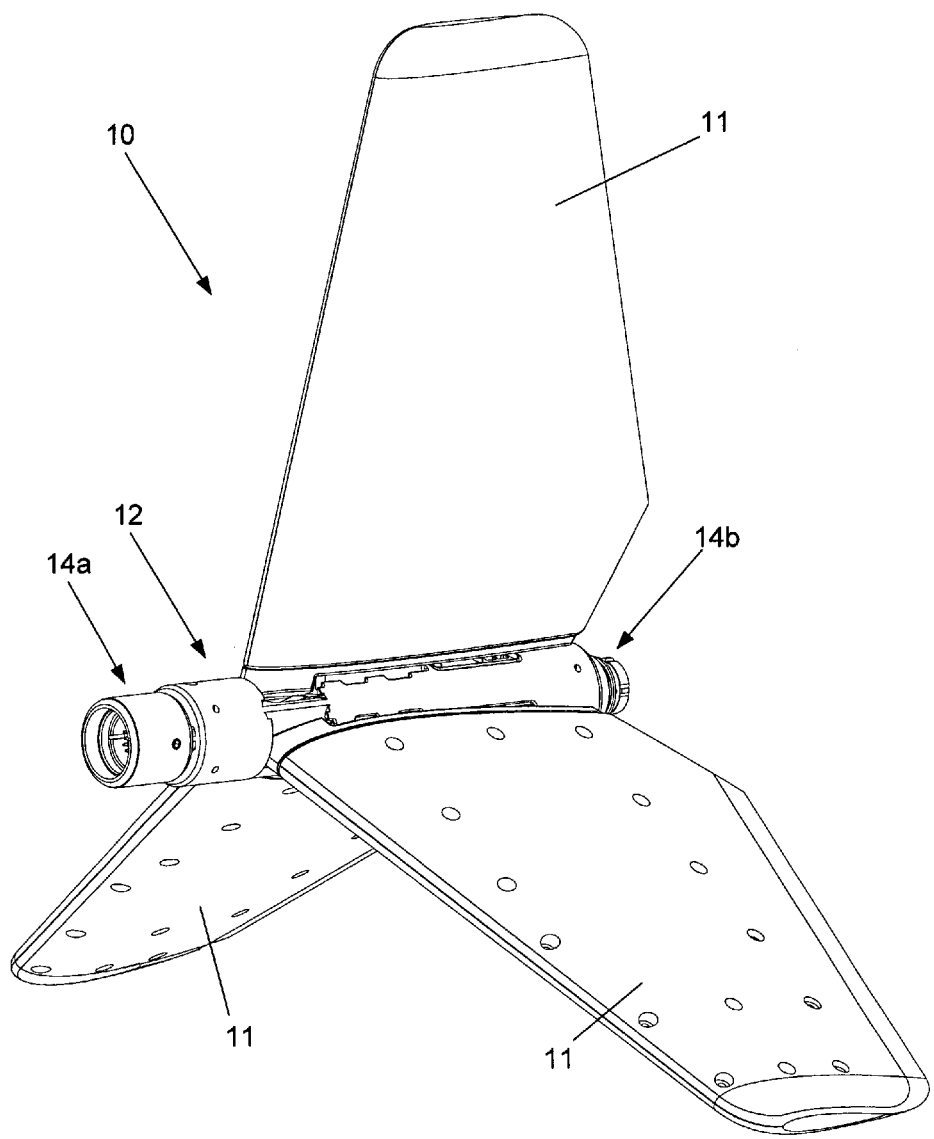

| | | |
|---|---|---|
| 2003/0039170 A1* | 2/2003 | Soreau et al. ............... 367/17 |
| 2005/0268835 A1* | 12/2005 | Le Page et al. ............ 114/245 |
| 2005/0270902 A1* | 12/2005 | Tonnessen .................. 367/23 |
| 2006/0285434 A1 | 12/2006 | Welker et al. |
| 2008/0008032 A1* | 1/2008 | Welker ........................ 367/16 |
| 2009/0025622 A1 | 1/2009 | Catherin et al. |
| 2010/0020637 A1* | 1/2010 | Welker et al. ............... 367/16 |

* cited by examiner

CONTROL DEVICE FOR POSITIONING AN INSTRUMENTED CABLE TOWED IN WATER

This application is a 371 of PCT/NO2010/000267, filed on Jul. 6, 2010, which is incorporated herein by reference.

The invention relates to a control device for positioning an instrumented cable towed in water, such as a marine seismic streamer, and/or an instrumented towed cable array (streamer array), wherein the control device is provided with acoustic means in connection with one or more wings, main body or other suitable locations for determination of position and range, according to the preamble of claim 1.

BACKGROUND

A seismic instrumented cable (streamer) is an elongate cable like structure (often up to several thousand meters long), which comprises an array of hydrophone cables and associated with electric equipment along its length, and which is used in marine seismic surveying. In order to perform a 3D/4D marine seismic survey, a plurality of such instrumented cables is towed behind a seismic survey vessel. Acoustic signals produced by the seismic sources are directed down through the water and into the seabed beneath, where they are reflected from the various strata. The reflected signals are received by the hydrophones, and next digitized and processed to build up a representation of the earth strata in the area being surveyed.

The instrumented cables are typically towed at a constant depth of about five to ten meters, in order to facilitate the removal of undesired "false" reflections from the water surface. In order to keep the instrumented cables at a constant depth, control devices known as "birds" are attached to each instrumented cable at intervals of 200 to 300 meters.

Low frequency depth variations and lateral motions are inevitable. The main reasons for instrument cable depth variations are long periodic waves. In general, the worst-case situation is when towing in the same direction as the swell. Instrument cable lateral motions are mainly due to sea current components perpendicular to the towing direction. In the case of both swell and cross-current influences, the risk of streamer entanglement is therefore increased.

The instrument cable tension decreases proportional to the distance from the towing point. Therefore, low frequency instrument cable lateral and vertical motion tends to have larger amplitudes closer to the tail. However, the forces acting perpendicular to the instrument cable are non-uniformly distributed over the instrument cable length, and change over time as the towed array moves forward.

During a seismic survey, the instrument cables are intended to remain straight, parallel to each other, equally spaced and at the same depth. However, after deploying the instrument cables, it is typically necessary for the vessel to cruise in a straight line for at least three instrument cable lengths before the instrument cable distribution approximates this ideal arrangement and the survey can begin. This increases the time taken to carry out the survey, and therefore increases the cost of the survey. However, because of sea currents, the instrument cables frequently fail to accurately follow the path of the seismic survey vessel, sometimes deviating from this path at an angle, known as the feathering angle. This can adversely affect the coverage of the survey, frequently requiring that certain parts of the survey be repeated. In really bad circumstances, the instrument cables can actually become entangled, especially at the tail of the instrument cables, which can cause great damage and considerable financial loss.

U.S. Pat. No. 6,011,752 (Loran, D. Ambs et al.) describes a seismic instrumented cable position control module having a body with a first end and a second end and a bore therethrough from the first end to the second end for receiving a seismic streamer therethrough, at least one control surface, the at least one recess in which is initially disposed the at least one control surface movably connected to the body for movement from and into the at least one recess and for movement, when extended from the body, for attitude adjustment.

U.S. Pat. No. 6,671,223 B2 (Bittleston, Simon Hastings) describes a control device or "bird" for controlling the position of a marine seismic instrumented cable, which is provided with an elongate, partly flexible body which is designed to be electrically and mechanically connected in series with a instrumented cable. In a preferred form the control device has two opposed wings which are independently controllable in order to control the instrument cable's lateral position, as well as depth.

Moreover, it is known to use methods for controlling instrumented cables (streamers) which comprise the use of devices, such as GPS receivers, magnetic compass, acoustic transmitters, traditional hydrophones, or acoustic receivers, particularly dedicated for position determination. Use of externally mounted compasses has the disadvantage that they sometimes are lost or damaged due to the cables become tangled or in connection with other collision situations, and the compasses produce flow noise for adjacent seismic instrumented cables. In addition the compasses are powered by batteries which have to be replaced at certain intervals, and the compasses must be calibrated, repaired and replaced, which result in increased costs and time consumption.

From U.S. Pat. No. 5,761,153 it is known the use of both magnetic compasses and acoustic transmitter/receiver units, but these are also located externally, which make them vulnerable to damage as mentioned above in connection with use of compasses.

From U.S. Pat. No. 4,992,990 it is known the use of acoustic transmitter/receiver units arranged along the whole instrumented cable. The position is determined by trilateration of transmission times (and hence distance) between transmitter/receiver elements to form a triangle network, where two known positions are being used, preferably the position of a vessel and a float, whereas the transmitter/receiver unit is the third position being calculated in the triangle network. This method results in problems if mechanical or electrical failure occurs in hydrophone cables or other locations in the system. This publication also has the same problems as described above in relation to externally mounted transmitter/receiver units.

From U.S. Pat. No. 4,912,682 it is known the use of ultrasonic sonar transmitters which are positioned along an instrumented cable, and seismic receivers which are positioned along the instrumented cable, so that there are three receivers for each transmitter. However, this publication does not solve the disadvantages mentioned for the publications above.

U.S. Pat. No. 6,839,302 describe a solution of the problems mentioned above by suggesting a special section which can be mounted between traditional sections of the instrumented cable. However, this is an expensive and demanding solution and may in addition result in limited data redundancy and quality as it limits where the transmitter/receiver units can be located.

From U.S. Pat. No. 7,376,045 describes a system intended to solve all problems with the solution mentioned above. U.S. Pat. No. 7,376,045 describe a system comprising a number of acoustic transmitters mounted within the instrumented cables and arranged to transmit broadband signals having low cross-correlation between the signals from different transmitters; a number of acoustic receivers mounted within the instrumented cables and arranged to receive the signals from the transmitters; at least one processor arranged to cross-correlating the signals received by the receivers, having copies of the transmitter signals to determine transmitter identities of the received signals and to determine propagation times for the received signals; and a main processor arranged to transform the propagation times to distances between the identified transmitters and receivers, and to determine relative positions of the instrumented cables based on the distances. A substantial disadvantage of U.S. Pat. No. 7,376,045 is that it requires arrangement of transmitter/receiver elements in the instrumented cable which is space demanding in an instrumented cable. Another disadvantage is that the entire cable sections must be replaced in case of mechanical or electrical failure in the transmitter/receiver elements. In addition the distance from the point where the position is calculated will be different from the position where the control device is arranged, something which can result in inaccurate controlling of the instrumented cable.

Moreover, the control devices and control methods mentioned above are attended with numerous further disadvantages. Control devices hanging under the instrumented cable produces substantial noise as they are towed through the water. This noise interferes with the reflected signals detected by the hydrophone cables in the instrumented cables. Some of the control devices comprise a pair of wings or rudders which are mounted to a rotatable structure enclosing the seismic instrumented cable to generate a lift force in a specific direction. This is a relatively expensive and relatively complex electro mechanic construction which is very vulnerable in subsea operations.

OBJECT

The main object of the invention is to provide a control device (system) which entirely or partly remove the disadvantages of the prior art. Moreover, it is an object to provide a control device which is provided with acoustic means for accurate position determination and accurate ranging for the instrumented cable, cable array and/or control devices.

THE INVENTION

A control device according to the invention is described in claim 1. Preferable features and details of the control device are described in claims 2-12.

A control device for controlling an instrumented cable or cable array, such as a seismic streamer, in particular a multi section streamer, according to the present invention is based on the control devices described in the applicant's Norwegian patent applications NO 20080145, NO 20083830 and NO 20063182. Publications NO 20080145 and NO 20083830 describe control devices formed of a main body and at least three wings, so-called smart wings, or at least three motor and drive gear housings provided with wings. The term smart wing is used to illustrate that wing, power supply (batteries), control means, drive means and sensors are integrated into the one and same unit, referred to as smart wing, which wing easily can be attached and detached. The alternative including motor and drive gear housing is used to illustrate that power supply (batteries), control means, drive means and sensors are integrated into the one and same unit, referred to as motor and drive gear housing which is provided with a wing, which motor and drive gear housing forms a detachable unit which easily can be attached and detached. NO 20063182 describes a control device where power supply (batteries), control means, drive means are arranged in the main body, whereas detachable or fixed wings are arranged to the body.

The main body is preferably elongate and mainly tubular and is at its ends provided with mechanical and electrical connection means to be arranged in series between two adjacent sections of an instrumented cable. Moreover, the main body is at adapted positions provided with fastening and connection means for smart wings, motor and drive gear housings provided with wings, or only wings, which main body is adapted to the respective alternatives.

The control device includes as mentioned above preferably at least three such smart wings, three motor and drive gear housings provided with wings or only three wings, evenly distributed around the main body.

The following description take basis in the control devices described in NO 20080145 and NO 20083830, particularly NO 20083830. The smart wings are preferably duplex in the form of a fastening part and a wing part, where the fastening part is adapted for connection to the main body via adapted fastening and connection means. The wing part, which houses mechanics, electronics, control means and sensors, is connected to the fastening part by means of a shaft, and the wing part extends perpendicular from the fastening part and accordingly the main body. The wing part includes an outer protective housing, preferably of solid plastics, which housing is formed of two parts which are assembled to one unit having a wing shape/rudder shape, which has a tapering width out from the main body towards the end of the wing part.

The fastening part has a shape which is adapted to the fastening and connection means of the main body for detachable attachment, and can be considered as a quick snap connection. Moreover, the fastening part includes connection means for connecting the smart wing electronically and for signals to the instrumented cable/main body. These connection means can be a mechanical connection or in the form of wireless/contact-less transmission of communication, i.e. signals/data and energy between the main body and wings. Then there will be no need for mechanical connections for energy and communication between main body and wings, and that there is thus no risk of leakage. Such a solution only needs a mechanical fastening of the wings to the main body.

Moreover, wireless/contact-less transmission of energy and/or communication can be used to release the wings or motor and drive gear housings provided wings from the main body without using tools. This also enables possibilities for remote detachment of the wings or motor and drive gear housings provided with wings. By that the control device is provided with wireless/contact-less communication, communication with an external unit will also be possible for calibration and diagnostics, e.g. at the after-deck of a vessel.

Each wing part, both for smart wing and for the alternative with motor and drive gear housings provided with wing in one unit, is rotatable about an axis extending transversely to the instrumented cable and the wings will respond to control signals and sensor means for independent adjustment of the respective angle position of said wing, for in this way to control the lateral and vertical position of the instrumented cable. Moreover, the control device includes sensor means, such as a roll sensor arranged in the main body to determine rotational position of the instrumented cable and the main body in a plane perpendicular to the longitudinal axis of the instrumented cable. The control device is preferably also provided with a depth sensor, such as a pressure sensor, located in the main body.

By the use of the control device in a multi-section streamer including an electrical energy line, the control means are, in at least partly, arranged to receive electrical energy from the electric energy line. When the instrumented cable also includes a control line, the control means are preferably arranged to receive communication signals from the control line.

In order to avoid malfunction of the instrumented cable in case of mechanical damage of the control device (e.g. leakage), the feed-through of connectors between the cable sections are separate from the wing mechanisms, control means and sensors.

The control device includes electrical motors, preferably also gear and clutch, and may also include means for measuring the rotational position of the instrumented cable and control means, means for measurement of depth and means for measurement of mutual position between the instrumented cables/control devices.

The control means are preferably arranged to the smart wing housing or to the motor and drive gear housing by means of suitable means.

A preferable control strategy applied to a control device according to the invention is not based on a traditional "bank-to-turn" maneuver where the rotational position is determined from a combination of commanded lateral and vertical force, which in general vary continuously. Instead, the control device is controlled to a predefined rotational position given by a commanded lateral force alone, which in general is static for longer periods of time. The lift is approximately proportional to the plane area of the wings, with the square of the velocity through the water and with the wing attach angle which is controllable through the control means.

The control device will be operated on basis on command messages/settings through the instrumented cable from a control unit onboard the vessel which performs the operation.

As mentioned above, the smart winds or motor and drive gear housings provided with wings are detachably arranged to the main body, and the control devices are preferably distributed along the entire cable length, preferably with approximately the same distance between them.

The control devices are arranged to control both the vertical and the lateral movement, preferably simultaneously. The control means can produce the commanded lift by means of actuators (motors). The smart wings and motor and drive gear housings provided with wings are preferably arranged symmetrically around the longitudinal axis of the instrumented cable and the main body.

The above described method of control is only one of several control methods which can be implemented for an instrumented cable which is provided with control devices according to the present invention, which is described, in among others, the applicant's patent application NO 20063182.

However, the method described above for controlling the respective control device is a simplified presentation of how an instrumented towed cable or a cable array is controlled. The control of a cable array is highly complicated and it is not enough to control only the respective cables, but one in addition it is required to know the position of the instrumented cable(s) and the accurate position of the control device(s) to achieve an optimal control of the instrumented cables or cable array.

In this regard a control device according to the invention includes one or more acoustic transmitter/receiver elements (transducer), which elements preferably are integrated in or arranged to one or more wings of the control device, integrated in or arranged to one or more motor and drive gear housings, or integrated in or arranged to the main body itself.

The transmitter/receiver elements are preferably a unit which is bi-directional, but can also be divided into transmitter and receiver.

In this way the acoustic means are arranged to a stabilized platform (roll, depth), which provides higher accuracy compared to what can be achieved by the use of prior art, where acoustic transmitters and receivers are arranged in the cable itself or between cable sections.

By arranging the acoustic means in connection with the control device itself, an accurate position of the control device and/or the towed instrumented cable(s) can be achieved. This will result in better conditions for controlling the towed cable or cable array, by that there is a short arm from measuring point to desired reference point for the control device, contrary to prior art, where acoustic transmitters and receivers are located within the cable or in sections of the cable, and in this way provide measuring points which are different from the location where the control device is going to apply direction control on the cable.

The present invention provides a compact construction having fewer parts, compared to prior art, and acoustic transmitters and receivers do not have to be implemented in the cable, which results in a substantial saving of space in the cable which has a given size.

As mentioned above, the transmitter/receiver elements are preferably bi-directional. The transmitter/receiver elements are preferably broadband transmitter/receiver elements which are arranged to transmit/receive DSSS signals ("DSSS—Direct Sequence Spread Spectrum"). Moreover, the transmitter/receiver element are arranged to simultaneously receive number of encoded signals. Preferably, the transmitter/receiver elements have a number of Doppler channels to perform optimal processing with regard to Doppler. Preferably, the transmitter/receiver elements include a set of matching filters for each Doppler channel.

By means of the present invention a desired coverage area can be combined with minimum transmitted acoustic energy and best possible masking of undesired received acoustic energy. Moreover, arranging acoustic transmitter/receiver elements in connection with the control device will result in that the transmitter/receiver element is symmetrical about a plane, something which results in a compact design of the transmitter/receiver element (transducer).

Several solutions of the transmitter/receiver element are conceivable, such as a "sandwich" element having an attachment in the middle of the active element and one "head" each direction, or that the transmitter/receiver element is an active element of "composite" type casted in a suitable plastic material.

The fact that the transmitter/receiver element is arranged in connection with, e.g. the wing of the control device or motor and drive gear housing, which wings or motor and drive gear housings in addition are detachable, makes it simple to calibrate, replace or repair defect transmitter/receiver elements in that the wings or motor and drive gear housings easily can be detached from the control device. By using prior art, the worst case scenario will require replacement of whole sections of the instrumented cable if transmitters or receivers are malfunctioning.

By using a control device having one or more acoustic transmitter/receiver elements one can achieve acoustic ranging for simultaneous measurements of number of distances between transmitter and receiver located in a stabilized platform, i.e. the control device, in connection with the instrumented cable.

The stabilized platform enables use of direction-controlled transmitters and receivers which will provide substantially improved sensitivity, reduced influence of noise and multi-directional interference. The transmitter/receiver elements are preferably arranged for two acoustic beams/signals which point in the same plane, but in opposite direction. The transmitter/receiver/signals also have sensitivity along the instrumented cable for enabling in-line measurements, i.e. measurements along the instrumented cable. The ranging will be processed to determine the relative position of the transmitter/receiver elements on the instrumented cable, i.e. the position of the control device.

The acoustic transmitter/receiver elements are as mentioned above preferably combined for both transmission and reception of the acoustic pulse. Moreover, the transmitter/receiver element has a focused sensitivity in the transversal direction of the instrumented cable. This result in a considerably higher sensitivity to transmitter on cables located on both sides, and thus reduces the required signal strength, and reduces the influence of noise and multi-directional interference.

The stabilized platform, i.e. the control device, will when integrated in or arranged to the wing maintain the direction of the acoustic beams/signals in the horizontal plane of the wings of the control device.

The acoustic transmitter/receiver elements are arranged for using broadband spread spectrum signals, such as DSSS signals, which are particularly designed for providing high auto correlation for the signal sequences to be detected, including low cross-correlation properties to other sequences. The receiver can detect and distinguish between a large number of different signal sequences. The range system also includes Doppler processing.

In addition to the advantages mentioned above, the control device can easily be installed and uninstalled in an instrumented cable. This is special achieved by the wing, control means, drive means, power supply and acoustic transmitter/receiver elements are provided as a detachable unit. When an instrumented cable is to be reeled up on a drum, the smart wings or motor and drive gear housings provided with wings can easily be removed and therefore do not cause any problems during collection on the drum. Another advantage of the present invention is that if drive means, wing, acoustic transmitter/receiver elements or something else should be malfunctioning or become damaged, the smart wing or motor and drive gear housings provided with wings can easily be replaced without replacing the entire control device or replacing entire sections of an instrumented cable.

In that the smart wing or motor and drive gear housings provided with wings contain the most of the electronics, sensors, power supply, drive means and acoustic means, one will also, in addition to what is mentioned above, achieve a compact design having fewer parts than prior art.

Moreover, an advantage of the present invention is that the control device can be arranged for wireless/contact-less transmission of data and energy, something which will be a substantial advantage.

Further advantageous details and features of the invention will appear from the following example description.

EXAMPLES

Figure 1B:
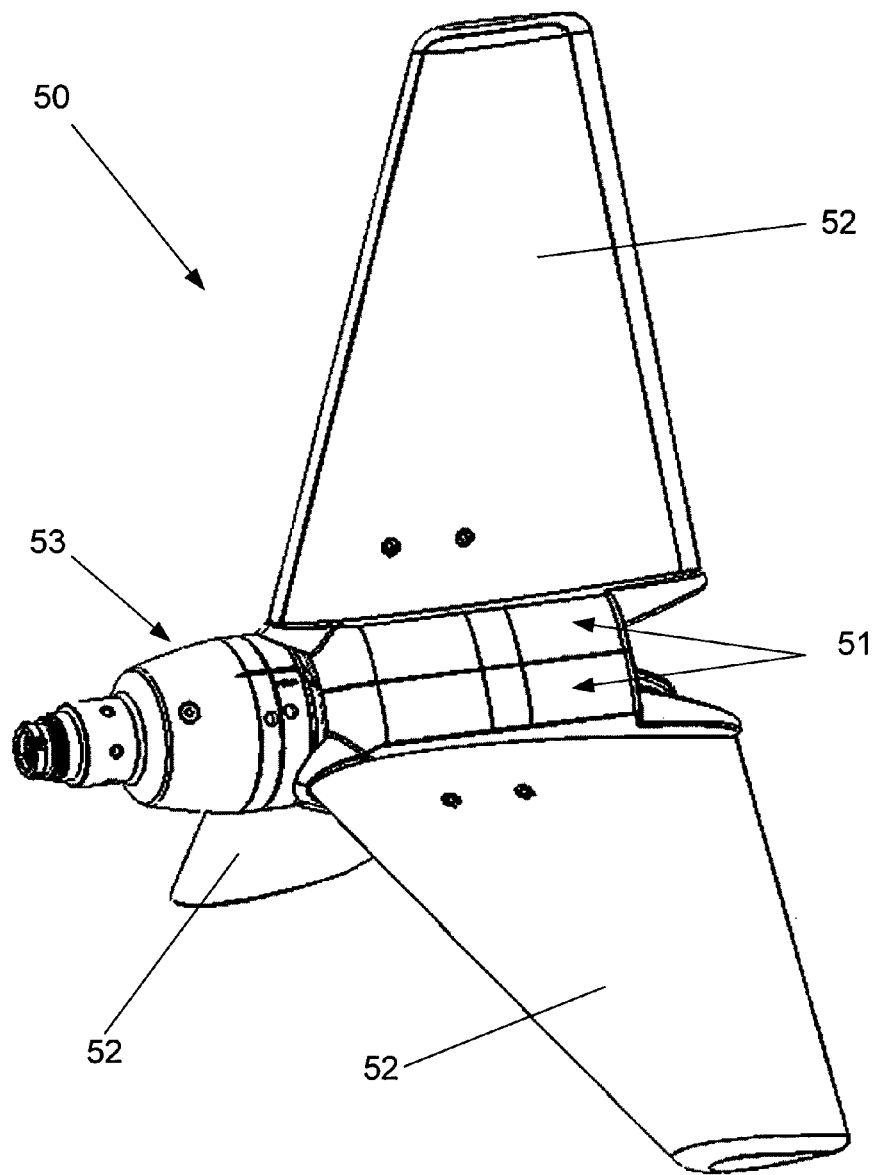
Figure 2A:
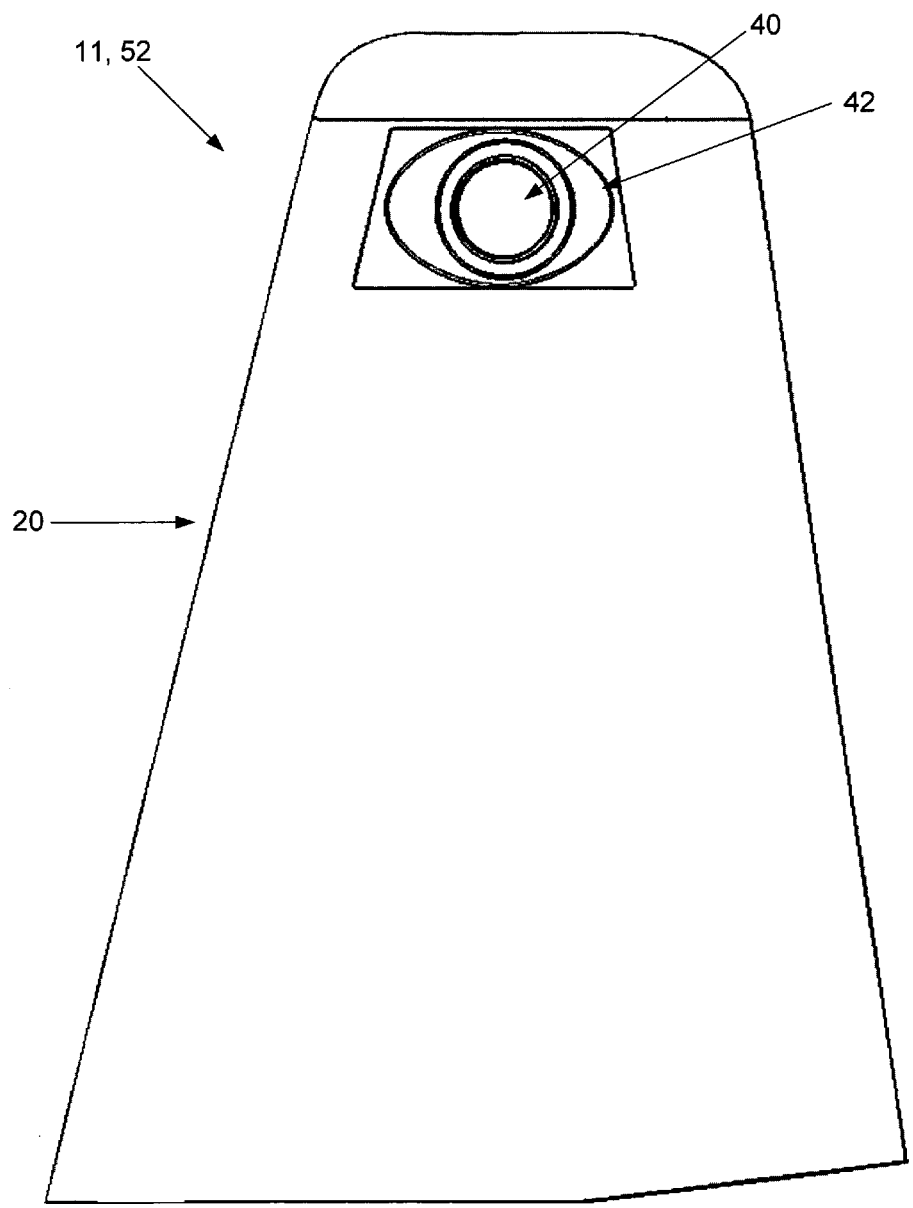
Figure 2B:
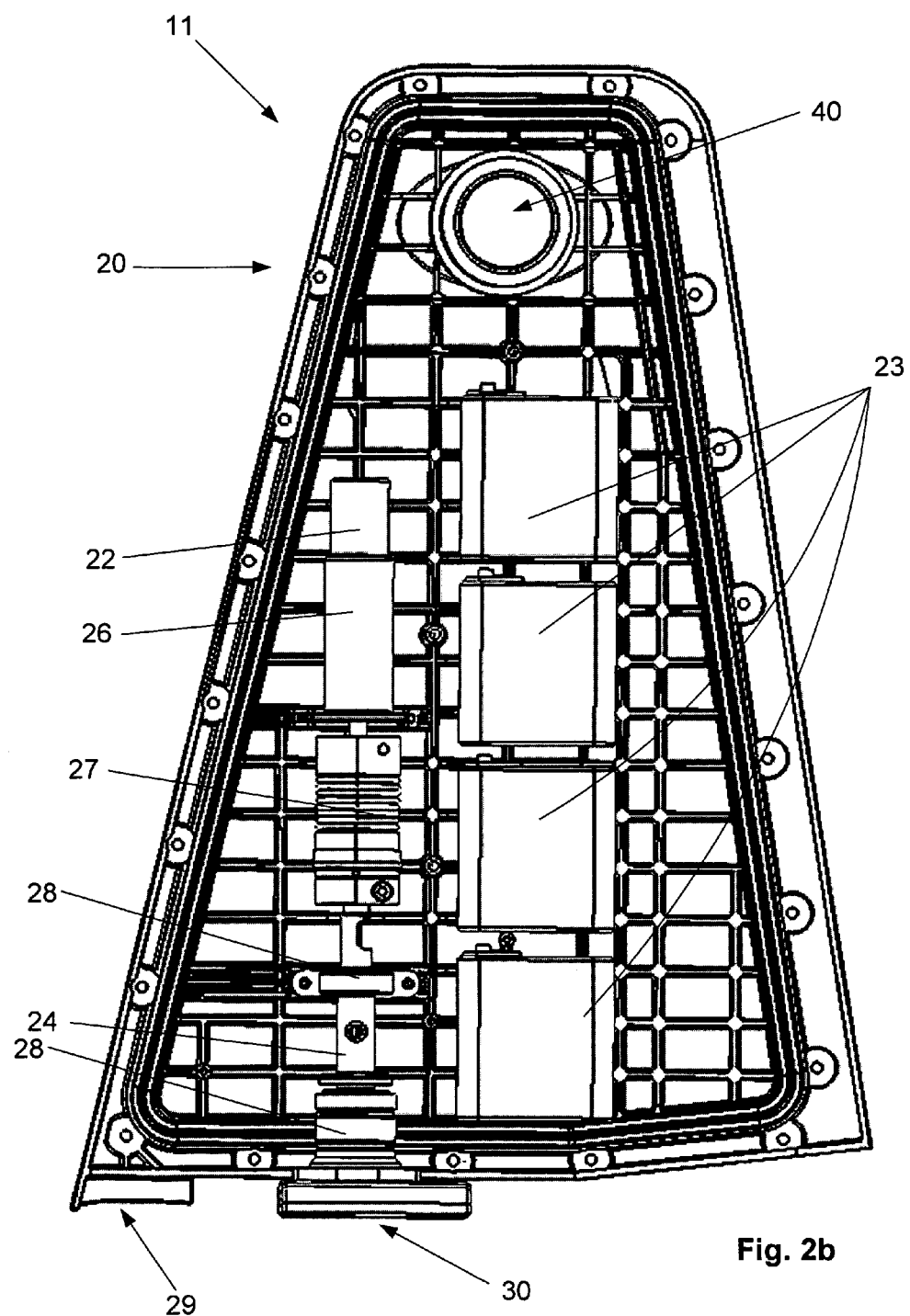
Figure 3A:
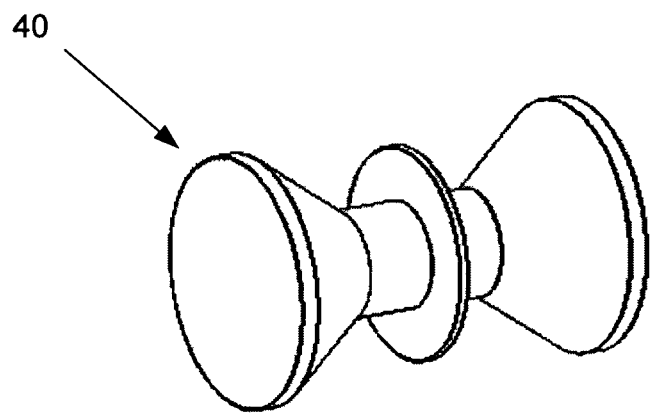
Figure 3B:
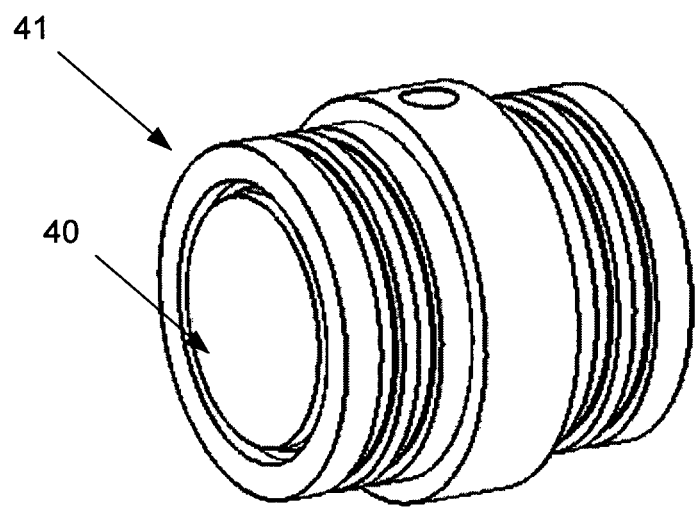
Figure 4:
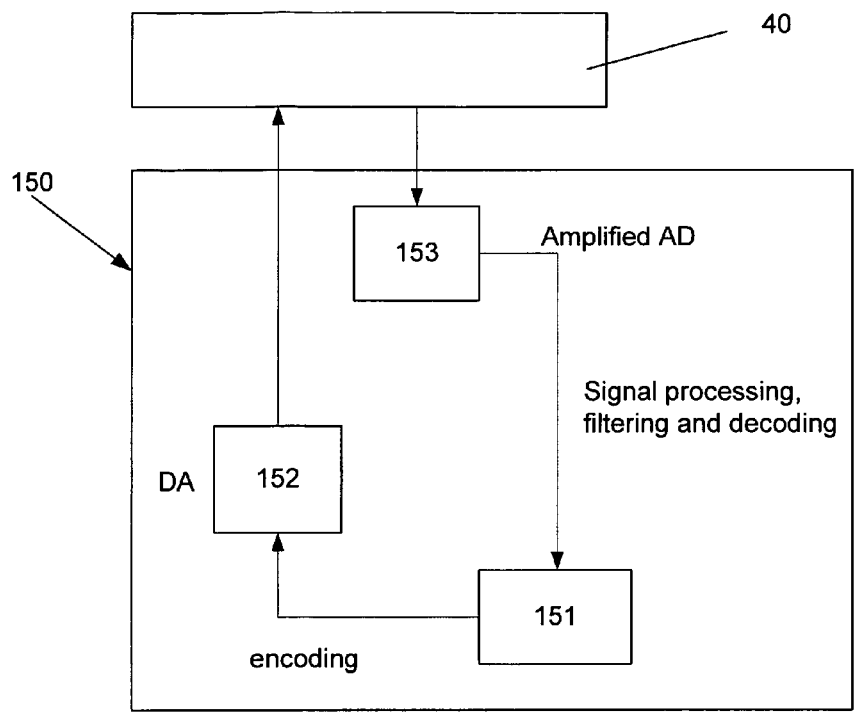
Figure 5:
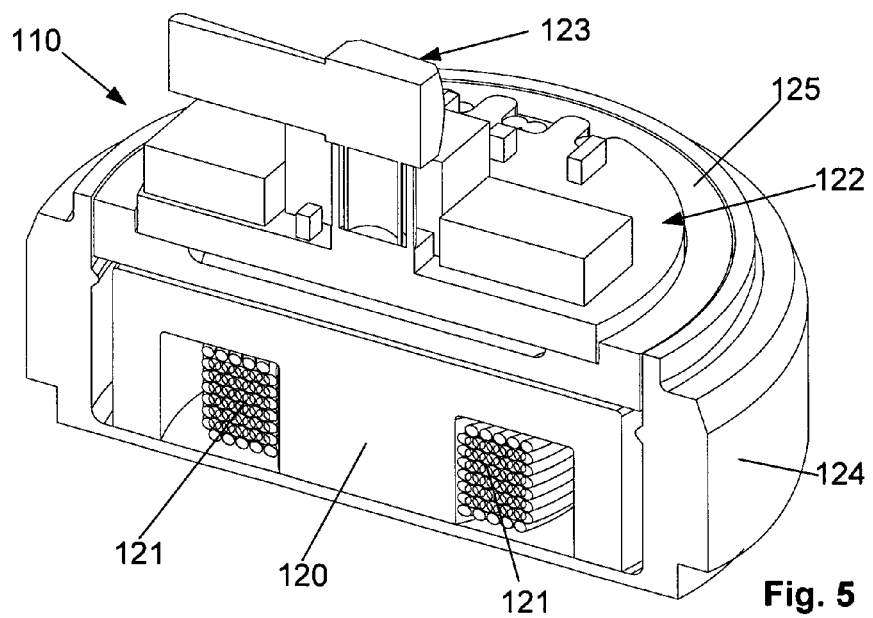

The invention is in the following described in more details with reference to the drawings, where FIGS. 1a and 1b show a first embodiment and second embodiment of a control device for connection between two cable sections, without acoustics, FIG. 2a shows a wing for the control device of FIG. 1a or 1b, provided with acoustic transmitter/receiver elements, FIG. 2b shows a partially cut view which shows details of a wing part of the control device according to FIG. 1a, provided with acoustic transmitter/receiver elements, FIG. 3a-b show details of acoustic transmitter/receiver elements, FIG. 4 shows a universal transponder circuit card for the transmitter/receiver elements/control device, and FIG. 5 shows details of means for wireless/contact-less transmission of communication and/or energy.

FIG. 1a shows a first embodiment of a control device 10 to be connected in series between two adjacent cable sections of a multi-sectional cable/streamer. A control device 10 according to a first embodiment includes three similar wings 11, so-called smart wings, which are evenly distributed about a main body 12, and is a so-called three axis bird. In the illustrated example with three smart wings 11, there will be 120° between the wings 11. In addition the smart wings preferably includes a guard 29 arranged to the wing by means of suitable means or integrated in the wing. The guard has a mainly elongated elliptical shape with an interior and external surface, which surfaces have a shape and size similar to the cross-sectional shape of the wing. The guard is at the interior surface provided with a protruding element which has a shape similar to the cross-sectional shape of the wing and a size adapted to move in mainly rectangular recesses arranged in the main body. The purpose of the guard is to prevent objects in the water, such as seaweed, rope, plastic etc. from being attached between the wing and the main body. The main body 12 is mainly an elongated streamlined tubular housing, which at its ends include connection means 14a and 14b adapted for mechanical and electrical connection in series in a multi-sectional instrumented cable, of the kind being towed behind a seismic survey vessel. The connection means 14a-b are for this reason adapted to similar connection points (not shown) at each end of each cable section, which connection points usually are used for connecting two adjacent cable sections.

Moreover, the main body 12 includes specially shaped attachment and connection means for connecting the smart wings 11 both mechanically and electrically. The main body 12 is provided with printed circuit cards and electronics for communication with an external control unit via the control line of the cable. The main body 12 is preferably arranged so that the feed-through of conductors between the cable sections are separated from wing mechanisms, drive means, control means, sensors and acoustic means (described below). This is to avoid malfunction in case of mechanical damage of the control device, e.g. leakage.

The main body 12 preferably further includes a roll sensor (not shown) and/or a depth meter (not shown), preferably in the form of a pressure sensor.

Reference is now made to FIG. 1b which shows a control device 50 according to a second embodiment. A control device 50 according to a second embodiment is formed by a main body 53 provided with detachable motor and drive gear housings 51 which again is provided with wings 52. The motor and drive gear housings 51 are arranged for connection to the energy line and power line through connections in the main body.

Reference is now made to FIG. 2a which shows an external view of a wing 11, smart wing or wing 52 for motor and drive gear housing 51, and in particular to FIG. 2b which shows a partially cut view of a smart wing 11 according to the invention. The control device 10 is as mentioned above provided with three smart wings 11, or rudders, which smart wings 11 extent perpendicular from the longitudinal axis of the main body 12 and accordingly the instrumented cable. The smart wings 11 are preferably formed by two parts, one wing part 20 and a fastening part 30. The fastening part 30 is adapted for attachment and connection to the main body 12 through its fastening and connection means. The fastening and connection means and the fastening part 30 are preferably formed to provide a quick-snap connection, both mechanically and electrically, which is explained in further detail below. The wing part 20, which accommodates drive means 22, power supply 23 (batteries) and possible sensors (not shown), are connected to the fastening part 30 by means of a shaft 24 and the wing part 20 extends thus perpendicularly out from the fastening part 30 and accordingly the main body 12. The wing part 20 includes an exterior protective housing, preferably of solid plastics, said housing preferably being formed of two parts which are interconnected to one unit with wing shape/rudder shape, which has a tapering width out from the main body 12 towards the end of the wing part 20.

The drive means 22 are preferably one or more electrical motors which further preferably are connected to a gear 26 which again preferably is connected to the shaft 24 via a clutch 27. Neither gear nor clutch is required, but will constitute an advantage in connection with the controlling of the system and for the lifetime of the control device. The drive means 22 are provided with energy through conductors in the instrumented cable, through at least a rechargeable buffer battery 23 for backup power in case of energy loss and to avoid overloading of the energy system of the instrumented cable.

The drive means 22 are connected to the wing part 20 in a suitable manner and preferably includes sleeves and bearings 28 to achieve a fixed location of the shaft 24 and to ensure as low resistance in the rotation of the shaft 24 as possible.

The fastening part 30 has, as mentioned above, a shape which is adapted to the fastening and connection means 15 of the main body 12 for detachable attachment, and can be considered as a quick-snap connection. The fastening part 30 includes connection means to connect the smart wing electrically and for signals to the cable/main body 12 via adapted connection means in the main body 12.

Each wing part 20 (and guard 29) is then rotatable about an axis extending transversal to the instrumented cable and the wings 11 will respond to control signals and sensor means for independent adjustment of the respective angular position of said wing part 20, for in this way to control the lateral and vertical position of the instrumented cable.

In a preferred embodiment the control device 11 is advantageously adapted for wireless/contact-less transmission of communication, i.e. signals/data, and/or energy between main body 12 and wings 11, preferably both communication and energy. In an embodiment adapted for wireless/contact-less transmission of communication and/or energy between main body 12 and wings 11, the main body 12 and the wings 11 do not need to include mechanical connections for connecting electricity and control signals.

Wireless transmission of communication and/or energy is achieved in that means 110 for wireless transmission of energy and/or communication are adapted to be arranged in connection with the shaft 24 and the main body 12, respectively. Means 110 for wireless transmission of energy and/or communication, shown in detail in FIG. 5, are preferably similar with both wing 11 and main body 12 and arranged in each respective wing 11 and correspondingly arranged for each wing 11 at suitable locations in the main body 12, so that means 110 for wireless transmission in main body 12 and wing 11 are arranged against each other, preferably with smallest possible distance, preferably in the rotational axis of the wing 11 in relation to the main body 12.

Means 110 for wireless transmission includes a core 120, one or more coils 121, printed circuit card 122, coaxial connectors 123 and encapsulation 124.

The core 120 is preferably a ferrite core or similar, which preferably is mainly disc shaped with a defined depth/width, and preferably has a mainly circular recess at one side to accommodate the coil(s) 121. The coil(s) are wound with adapted wire and number of turns to optimize efficiency in transmission of energy/signal/data. Also the diameter/size of the core 120 will be decisive in the level of efficiency of the system and therefore must be adapted to achieve the actual efficiency level.

If appropriate, said means 110 for wireless communication can also include a buffer plate 125 arranged between the core 120 and electronics card 122 to avoid short-circuit, and the buffer plate 125 is preferably provided with guide holes for coil wire to the circuit card 122.

Moreover the coil(s) 121 and core 120, including the buffer plate 125 if used, are cast into one encapsulation 124 of material having low water penetration, low water absorption, low dielectric coefficient and high weather resistance (treated against UV radiation), such as polyurethane.

An advantage of using a buffer plate 125 is that the encapsulation/casting of the buffer plate 125 between core 120 and electronics card 122 also avoid short-circuit, but this can also be achieved by replacing the buffer plate 125 with an encapsulation, which will be chosen in most of the cases.

The encapsulation 124 is preferably cast in a special type of epoxy to ensure high fastening to the components. The casting of the encapsulation 124 is preferably performed in a vacuum chamber to remove air bubbles and thus ensure better pressure properties.

Means 110 for wireless transmission is arranged so that the printed circuits card 122 faces inwards against the shaft 24 of the wing 11 and the internal of the main body 12, so that the core 120 and coil(s) 121 are arranged against each other for means 110 for wireless/contact-less transmission in wing 11 and main body 12.

The printed circuit card 122 is arranged with/provided with control electronics adapted to the encapsulation 124 with core 120 and coil(s) 121 and optionally buffer plate 125, and includes electronics for communication/signal treatment, said printed circuit card 122 being arranged adjacent to the encapsulation 124, against the buffer plate 125 if used. The circuit card 122 preferably further includes a coaxial connector 123 and connectors for radio signals. Moreover, the printed circuit card 122 includes one or more coil plugs for connection the coil wires. Moreover, the circuit card 122 includes connectors for "plug electronics" to charger/feed circuit on the circuit card of the wing 11 and the circuit card of the main body 12, and connectors for "plug electronics" to radio chip on circuit card of the wing 11 and the circuit card of the main body 12. It should be mentioned that the different contacts/connectors described above can be soldered directly onto the circuit card.

In this way it has been created a wireless/contact-less transmission of energy and communication, wherein the coil(s) 121 are being used both for energy transmission and as an antenna for communication. In that the transmission of energy and communication are performed at different frequencies, which frequencies preferably are spaced some apart, they will not interfere with each other.

In this way it has been provided a wireless/contact-less transmission between main body 12 and wings 11, which wireless/contact-less transmission can be both unidirectional and bidirectional, which results in a far more robust system for operation in demanding environments as instrumented cables (streamers) usually are operating in. Moreover, the wings 11 are not connected mechanically to the instrumented cable or main body 12, electrically or for signals, which results in more stable operating conditions of the entire system and less risk for malfunctioning.

Reference is now made to FIG. 2a, which illustrates a control device 10, 50 according to the invention provided with acoustic means. A control device 10, 50 according to the invention includes acoustic means arranged to the wing part 10/wing 11,52, preferably as an integrated unit, but can also be arranged to the wing part 20/wing 11, 52 in another suitable manner, such as attached by means of suitable fastening means. In the description below, the arrangement of the acoustic means will be described in view of an embodiment which above is described as a smart wing, as shown in FIG. 2b, but it should be clear that the description in a simple manner can be modified to adapt an embodiment of a control device 50 having detachable motor and drive gear housing 51 or a control device having detachable wings as shown in NO 20063182.

Reference is now made to FIG. 2b for a detailed description of a control device with acoustic means. The acoustic means are preferably, as shown, integrated into the wing part 20, so that the acoustic means are protected and to provide a compact and robust unit. The acoustic means are preferably in the form of acoustic sender/receiver elements 40, for example, in the form of transducers. The transmitter/receiver elements 40 are preferably a bidirectional unit, but can also be divided into a separate transmitter and receiver.

Numerous embodiments are conceivable for the transmitter/receiver element 40, for example as a "sandwich" element with attachment means in the middle of an active element and one "head" in each direction, as shown in FIG. 3a, or that the transmitter/receiver element 40 is an active element of "composite" type casted into a suitable plastic material. The transmitter/receiver element 40 is advantageously arranged in a protective housing 41, as shown in FIG. 3b, which housing 41 is adapted for being arranged in the wing 11/wing part 20 of the control device 10. The control device 10 is in turn preferably provided with protruding elements 42 (shown in FIG. 2a) on each side of the wing part 20, said protruding elements 42 are provided with through holes, adapted to the housing 41 of the transmitter/receiver element 40, to enable a fixed arrangement of the transmitter/receiver element 40 via its housing 41. Sealing means (not shown) are of course preferably arranged, such as O-rings or similar, between the housing 41 and the through holes of the protruding elements 42, for in this way to prevent intrusion of water or other foreign objects into the wing 11/wing part 20. The protruding elements 42 of the wing 11 are preferably designed to provide as low resistance as possible for the wing 11 in water and to provide the lowest possible noise around the wing 11 when it moves in the water. The transmitter/receiver element 40 is preferably arranged in such a manner in the protruding elements 42 that the transmitter/receiver element 40 extends entirely out in the opening of the through hole, on each side of the wing 11.

The acoustic transmitter/receiver elements 40 can be supplied with energy from the energy line of the instrumented cable, preferably via the buffer batteries, and communicate with an external control system such as an APOS—Acoustic Positioning Operator Station, which usually is arranged at a survey vessel controlling the survey operation, via the control line of the instrumented cable, either through direct connection as described above, or by means of means 110 for wireless transmission of energy and communication if the control device 10 is arranged for it. The acoustic transmitter/receiver elements 40 can either communicate with the external control system APOS via a data bus of the instrumented cable or together with the remaining communication of the control device 10 for communicating status from sensor and information about mechanical function and force via the data bus of the instrumented cable.

The control parameters are transferred to the control device 10 to control the control device 10 in the Y and Z direction. The control means in the control device 10 adjust the wing part 20 to correct position by means of the drive means 22.

In order to calculate these control parameters, information is required about the position of the instrumented cable or each single cable in the cable array, information about the position of the control devices 10 controlling the position of these cables, and information about mutual position in relation to other cables and control devices. Information on this can be found by using the acoustic transmitter/receiver elements 40 which are arranged to or integrated in the wings 11 of the control device 10, main body or motor and drive gear housing. A control device 10 according to the invention, as shown in FIGS. 2a and 2b, includes at least one transmitter/receiver element 40 in one of the wings 11, but naturally can all wings 11 be provided with transmitter/receiver elements 40 if desired. As mentioned above, the transmitter/receiver elements 40 are preferably bidirectional to provide a compact design. By arranging the transmitter/receiver elements 40 in connection with the control device 10, a stabilized platform (roll, depth) is achieved, for determination of distance and position, which results in better accuracy than is achievable through the use of prior art. Positions/distances of the control devices 10 and/or the instrumented cable can be determined accurately by that there is a small arm from the point of measurement to a desired reference point of the control device 10, which results in improved conditions for controlling the towed cable or cable array.

In that the transmitter/receiver elements 40 are arranged in connection with the control device 10, a more compact construction with fewer parts is achieved, compared to prior art, and acoustic transmitters and receivers do not need to be implemented in the cable, something which results in substantially saved space in the cable which has a given size. Acoustic transmitters and receivers can naturally be implemented in the cable in addition where it is desired.

Having a design as shown in FIG. 3a-b, the transmitter/receiver element 40 is symmetrical about one plane, i.e. in the horizontal plane of the wings 11 of the control device 10, which makes it possible to maintain the direction of the two acoustic beams/signals which are transmitted in the same plane, but in opposite direction.

This will enable the use of directional transmitter/receiver elements 40 which in a substantial way will provide higher sensitivity to transmitter/receiver elements 40 on cables/control devices, located on both sides and thus reducing the required signal strength, and reducing influence of noise and multi-directional interference.

The transmitter/receiver beams/signals do also have sensitivity along the instrumented cable to enable in-line measurements, i.e. measurements along the instrumented cable.

By means of the present invention, a desired coverage area can be combined with minimum transmitted acoustic energy and best possible masking of undesired received acoustic energy.

The fact that the transmitter/receiver element 40 is arranged in connection with the wings 11 of the control device 10, said wings 11 additionally being detachable, makes it easier to calibrate, replace or repair the defect transmitter/receiver elements 40 in that the wings 11 in a simple manner can be detached from the control device 10. By using prior art, the worst scenario will require replacement of whole sections of the instrumented cable if transmitters or receivers are malfunctioning.

The transmitter/receiver element 40 is preferably arranged to transmit and receive broadband signals, such as DSSS signals (Direct Sequence Spread Spectrum), which signals are specially designed to provide high auto correlation of the signal sequences to be detected, and low cross correlating properties to other sequences.

Moreover the transmitter/receiver element 40 is arranged in such a manner that it can transmit and receive simultaneously, for example, transmit on one channel at a time and receive on 8 channels at a time. That means that the transmitter/receiver element 40 is arranged to simultaneously detect a number of different encoded signals. The transmitter/receiver element 40 preferably has a number of Doppler channels for optimal processing with regard to Doppler signals. Moreover, a set of matching filters for each Doppler channel is being used.

FIG. 4 shows a transponder circuit card 150 for communicating between the transmitter/receiver element 40 and an external control system, such as APOS. In order to allow the transmitter/receiver element 40 to communicate with an external control system, such as APOS, the control device 10 according to the invention includes a transponder circuit card 150 arranged in the wing 11 by means of suitable means. It should be noted that the arrangement of the transponder circuit card 150 is not illustrated in FIG. 2b. The transponder circuit card 150 is connected to the transmitter/receiver elements 40 and the control line and energy line of the instrumented cable, either directly through mechanical connectors of the control device 11, or via means 110 for wireless/contact-less transmission of communication and/or energy the control device. The transponder circuit card 150 is preferably arranged to be commanded to transmit or listen. In a preferred embodiment, the transponder circuit card 150 is divided into three units/cards to provide a compact design, respectively:

a digital processing card 151 for encoding signals and controlling when the transmitter/receiver elements 40 are to transmit and/or receive, signal processing, such as filtering and decoding of signals, and communication with an external control system, such as APOS, a transmitter card 152 for DA conversion of control signal and excitation on the transmitter/receiver element 40, and a receiver card 153 for amplification and AD conversion of received signal on the transmitter/receiver element 40.

All these three cards 151-153 are supplied with energy via the buffer batteries of the control device, but preferably a controllable switch (not shown) can be arranged in the wing 11 to control the energy supply to these cards 151-153. It should be noted that these cards can be integrated on the same card if this is appropriate or desirable. Preferably, the cards 151-153 are separate from the remaining circuit cards of the control device 10, but they can if desirable be integrated in the remaining circuit cards of the control device.

The external control system which controls the transmitter/receiver elements 40 is preferably an acoustic positioning operator station (APOS). APOS communicates with the transmitter/receiver element 40 via a data bus of the instrumented cable. By using a control device 10 with one or more acoustic transmitter/receiver elements 40, one can achieve an accurate position determination and accurate ranging of the instrumented cable, cable array and/or control device, including simultaneous measurements of a number of distances between transmitter/receiver elements 40 located in connection with other control device 10/cables.

In the following, ranging and position determination by means of the acoustic transmitter/receiver elements 40 will now be described.

The transmitter/receiver elements 40 can operate in two ways:
  bidirectional sound-in-water, or
  unidirectional sound-in-water with pulsed time synchronization of the transmitter/receiver element.

The transmitter/receiver elements 40 are, as mentioned above, controlled by e.g. an APOS which transmits information about which control devices 10/transmitter/receiver elements 40 to be listening or transmitting. This can be done in several ways:
  APOS can transmit synchronization pulses with sufficient timing accuracy, or
  all control devices are synchronized and the time for transmission is distributed to the control device to be interrogated and the control device to be listening.

The transmitter/receiver elements 40 of the control device 10 which are to receive the signal must arrange a time tag on the received signal, and then send the information as <channel, time tag, channel, time tag etc.> to APOS on request. It is important that the transmitter/receiver elements 40 have sufficient time to process the ongoing synchronizing pulse completely before the next synchronizing pulse is transmitted from APOS.

Then APOS can calculate distances based on collected information. Processing of the received signals provide the propagation time between the transmitter/receiver elements 40 and accordingly the distance between these. These distances can then be used to calculate relative positions of the transmitter/receiver elements 40 and accordingly the control device 10 and the instrumented cable(s).

The acoustic signals/pulses which are transmitted from the transmitter/receiver elements 40 of control device 10 which are commanded to transmit can be detected by the acoustic transmitter/receiver elements 40 of the control device 10 which are commanded to listen. That means that the transmitter/receiver elements 40 which are commanded to transmit, transmit a unique acoustic signal according to a predefined timing schedule for transmission of the transmitter/receiver element 40 in question. At least one other transmitter/receiver element 40 detects the transmitted signal during a predefined listening window of the transmitter/receiver element 40. The propagation time between the two transmitter/receiver elements 40 can then be estimated based on the time difference between known transmission time and the calculated reception time at the other transmitter/receiver element 40, of the transmitted signal from the first transmitter/receiver element 40. The distance between the two transmitter/receiver elements 40 can then be calculated on basis on the measured sound velocity profiles initially, which is automatically handled by the system.

Due to the transmitter/receiver element 40 can listen for acoustic signals from several transmitter/receiver elements 40 simultaneously, the distance to several transmitter/receiver elements 40 can be determined at the same time.

The distances can next be used to determine relative position by means of advanced triangulation. Known points which are used during advanced triangulation are usually the vessel and tail buoys. In order to be able to perform advanced triangulation, the vessel and tail buoys are provided with transmitter/receiver elements in the same way as the control device. As mentioned in the introduction, this is not required as the distance from the vessel to the first control device on an instrumented cable can be considered as constant, and the distance from the last control device on the instrumented cable to the tail buoy can be considered as constant.

The absolute positions of the entire cable array can next be determined from relative position, and navigation data from the vessel and tail buoys. The absolute positions can then be compared with an absolute reference, and the difference gives the "Cross Track Error". "Cross Track Error" will then provide the distance between actual position and desired position, which is the distance from the receiver position to the calculated position, to which the control device are to be position controlled in relation to.

Cross Track Error can next be used of an external control system, such as a STAP system (Seismic Towed Array Positioning System), to control the control devices/the instrumented cable(s).

If the sound is chosen to be transmitted bidirectional through the water, there is a risk of achieving very few ranging per unit of time.

The control of which control devices which are to be transmitting and which are to be listening must be performed per control device, which results in a complicated command structure and large traffic on the communication channel of the instrumented cable, which already has a limited band width.

If the sound is chosen to be transmitted unidirectional through the water, the synchronization becomes a challenge. One can thus have the opposite problem with too few ranging to be reported.

Modifications

Even though it in the description above is taken basis in a control device as in FIG. 1a, transmitter/receiver elements can in a similar way be arranged in one or more wings of a control device as shown in FIG. 2b and achieve the same results. It should also be obvious that the features of the two different control devices can be combined to provide further embodiments. It should also be noted that the technique described above also can be implemented on, e.g. a control device as described in NO 20064102.

Even though acoustic transmitter/receiver elements are described in relation to the control devices, it should be evident that a system also may include acoustic transmitters and receivers in the instrumented cables.

Acoustic transmitter/receiver elements are in the description stated arranged in the wing of the control device, but it is also possible to arrange these to e.g. the motor and drive gear housings of a control device which includes detachable motor and drive gear housings, or the transmitter/receiver elements can be arranged to the main body of the control device. It is also evident that a control device may include several transmitter/receiver elements on several locations, such as in several wings, both main body and wing if appropriate.

The transmitter/receiver elements can have a number of different designs and is not considered to be limited to the disclosed embodiment. Moreover, it is evident that the transponder card can be integrated in one or more of the original circuit cards of the control device.

Even though it is not advantageous, the transmitter/receiver elements can be adapted to be connected externally to the control device.

The invention claimed is:

1. A control device for controlling the position of an instrumented cable towed in water, such as a marine seismic streamer, and/or an instrumented towed cable array with the possibility of controlling the individual instrumented cables both in shape and position in relation to other instrumented cables and, by that, counteract cross currents and/or other dynamic forces which affect a towed array behind a seismic survey vessel, the control device comprising:
   a main body,
   wings connected to the main body,
   a connection means for mechanical and electrical connection of the control device in series between two adjacent sections of an instrumented cable, and
   a drive means for controlling the respective angular position of the wings to control the lateral and vertical position of the instrumented cable,
   wherein at least one of said wings comprises an acoustic transmitter and receiver element configured for direction controlled measurement of distances between adjacent control devices on parallel towed cables,
   wherein the transmitter and receiver element is symmetrical about a horizontal plane of the wing for transmitting two acoustic beams/signals in the same plane, but in an opposite direction, and wherein the transmitter and receiver element has a focused sensitivity in a transverse direction of the instrumented cable, and
   wherein the direction of the transmitting two acoustic beams/signals is controllable by the rotational position of the control device.

2. The control device according to claim 1, wherein the control device also includes one or more acoustic transmitter and receiver elements, arranged to, or integrated, the main body of the control device.

3. The control device according to claim 1, wherein the wings are adapted for electrical connection and signal connection to the adapted main body, or that the wings and the main body are provided with means for wireless transmission of energy and/or communication beams/signals for transmission from main body to wing, wing to main body, or both ways.

4. The control device according to claim 1, wherein the acoustic transmitter and receiver elements are arranged to transmit acoustic signals or pulses in one or two directions.

5. The control device according to claim 1, wherein the acoustic transmitter and receiver elements are directionally controllable, and have sensitivity along the instrumented cable to enable measurements of distances between adjacent control devices along the instrumented cable.

6. The control device according to claim 1, wherein the transmitter and receiver elements are arranged to transmit and receive broadband signals that are configured to provide high auto correlation of the signal sequences to be detected, and low cross correlation properties against other sequences.

7. The control device according to claim 1, wherein the transmitter and receiver elements are arranged to both transmit and receive signals or pulses.

8. The control device according to claim 1, wherein the control device is provided with communication means, such as a transponder circuit card, for communicating between an external control system, and the transmitter and receiver elements.

9. The control device according to claim 8, wherein the transponder circuit card is connected to the transmitter and receiver elements and a control line and energy line of the instrumented cable, either directly through mechanical connections of the control device or through means for wireless transmission of communication and/or energy to the control device.

10. The control device according to claim 8, wherein the transponder circuit card is arranged to be commanded to transmit and/or listen.

11. The control device according to claim 8, wherein the transponder circuit card includes three units or cards: a digital processing card for encoding of signals and controlling when the transmitter and receiver elements are to transmit and/or receive, signal processing, such as filtering and decoding of signals, including communication with an external control system, a transmitter card for DA conversion of control signal and excitation on the transmitter and receiver element, and a receiver card for amplification and AD conversion of received signal on the transmitter and receiver element.

12. The control device according to claim 1, wherein the transmitter and receiver element is designed as a sandwich element with a fastening point in the middle of an active element and a head in each direction, or that the transmitter and receiver element is designed as an active element of composite type casted in a suitable plastic material.

13. The control device according to claim 1, wherein the transmitter and receiver element is arranged in a protective housing, which housing being adapted to be arranged in the wing or wing part of the control device, which control device is provided with protruding elements at each side of the wing part, wherein the protruding elements are provided with through holes being adapted to the housing for fixed arrangement of the transmitter and receiver element via its housing therein.

14. The control device according to claim 1, wherein the acoustic transmitter and receiver element is divided in a separate transmitter and receiver.

15. The control device according to claim 1, wherein at least one battery, electronics and circuit card, sensors, and at least one electrical motor are integrated in each of the wings to control the respective angular position of the wings and to control the lateral and vertical position of the instrumented cable.

16. The control device according to claim 15, wherein the acoustic transmitter and receiver element is supplied with energy from the batteries arranged in the wing.

17. The control device according to claim 1, wherein the transmitter and receiver element is arranged for providing two acoustic beams or signals which are directed in the same plane, but in opposite directions.

18. The control device according to claim 1, wherein the beams/signals have sensitivity along the instrumented cable to allow measurements along the instrumented cable.

19. The control device according to claim 1, wherein the transmitter and receiver element has a focused sensitivity in a transverse direction of the instrumented cable.

20. The control device according to claim 17, wherein the control device is configured to maintain the direction of the acoustic beams or signals in a horizontal plane of the wings.

21. The control device according to claim 1, wherein the transmitter and receiver element symmetrical about a horizontal plane of the wings.

* * * * *